F. S. ELLETT.
COASTER BRAKE.
APPLICATION FILED JUNE 1, 1908.

921,653.

Patented May 11, 1909.

WITNESSES:
E. W. Carroll
L. Thon

INVENTOR:
Frederick S. Ellett
by Osgood & Davis
his attorneys

UNITED STATES PATENT OFFICE.

FREDERICK S. ELLETT, OF ELMIRA, NEW YORK, ASSIGNOR TO ECLIPSE MACHINE COMPANY, OF ELMIRA, NEW YORK.

COASTER-BRAKE.

No. 921,653.      Specification of Letters Patent.      Patented May 11, 1909.

Application filed June 1, 1908. Serial No. 436,150.

*To all whom it may concern:*

Be it known that I, FREDERICK S. ELLETT, a citizen of the United States, and resident of Elmira, in the county of Chemung and State of New York, have invented certain new and useful Improvements in Coaster-Brakes, of which the following is a specification.

This invention relates to coaster brakes for bicycles and like vehicles, and has for its object a simple, compact structure of few parts that are cheaply made and easily assembled.

Figure 1:
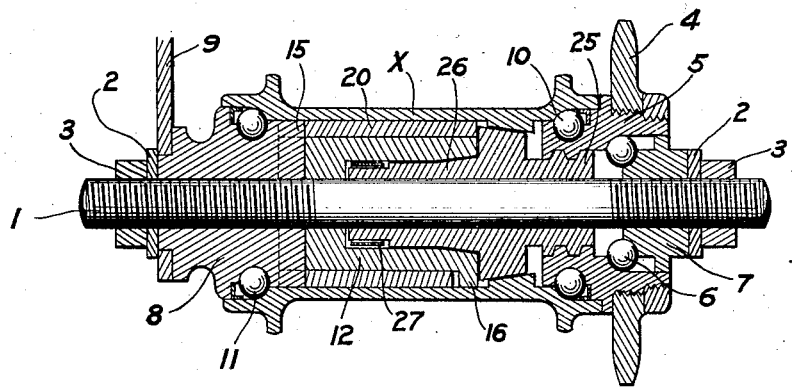
Figure 2:
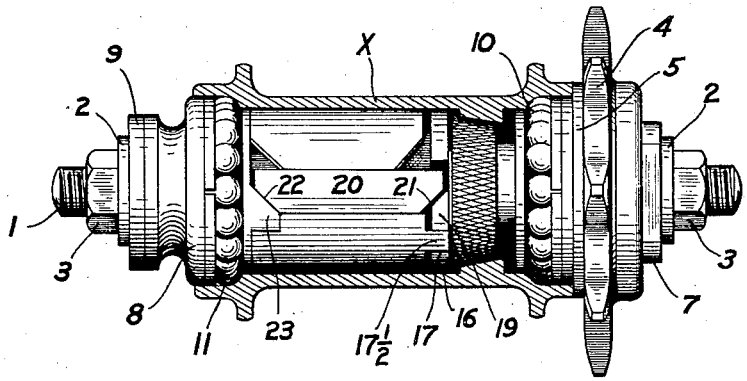
Figure 3:
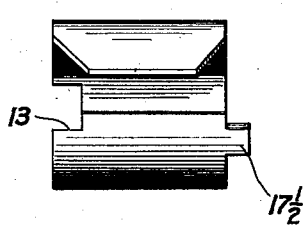
Figure 4:
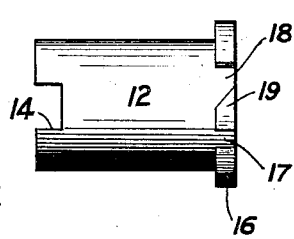
Figure 5:
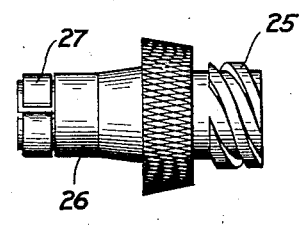

In the drawings:—Figure 1 is a central, longitudinal section of the rear or driving wheel of a bicycle, equipped with the coaster brake; Fig. 2 is a side elevation of the same, in section to show the parts within; and Figs. 3 to 5, inclusive, show parts of the brake mechanism.

This coaster brake resembles that described in my other application, Serial No. 430,400, already filed, in that a stationary, longitudinally split brake shell within the hub is expanded out against it by a brake actuator that is moved longitudinally on back pedaling, first to engage, and then to operate the brake.

Referring to the drawings, 1 is the axle, adapted to be locked within the rear forks 2, 2 of the bicycle frame by the nuts 3, 3, respectively. On one end of the axle, there is the usual sprocket 4, attached to the block 5, and supported by ball bearings 6 upon the cone 7. At the other end of the axle there is a stationary block 8, held against rotation by the arm 9, that is adapted to be connected to the bicycle frame. The hub X is rotatively supported by ball bearings 10 at one end and 11 at the other upon the sprocket block 5 and the stationary block 8, respectively, and the brake shell is supported by the carrier 12. Diametrical recesses 13 and 14 in the brake shell and carrier, respectively, receive the diametrical shoulder 15 on the stationary block 8, so that both brake shell and carrier are held against rotation, and the carrier is at the same time movable longitudinally toward and from the stationary block 8. A flange 16 on the inner end of the carrier is recessed at 17 to receive a lug 17½ on the brake shell, adjacent to the slot through it, and also at 18, in line with the slot in said brake shell to receive the expander.

So far, the hub and brake mechanism described are the same as those described in my said application, Serial No. 430,400, and, as in that application, the brake actuator is shown in the form of a longitudinally movable wedge 19 that is formed in one piece with the brake carrier 12 on its flange 16. But the longitudinally movable actuator 19 operates upon a brake expander that is novel. It is the bar 20 that lies upon the carrier 12 in the slot, between the edges of the brake shell. One end of this bar projects out into the slot 18 in the flange 16 on the carrier, and is beveled at 21 to correspond with the angular face of the wedge 19, while the other end is beveled at 22 to engage the angular face of a similar wedge 23 on the stationary block 8. This wedge 23 also lies between the edges of the brake shell in line with the wedge 19, and is directed toward it. Accordingly, when the actuator 12 is forced inwardly, toward the left in the drawings, the wedge 19 forces the bar 20 toward the left on to the wedge 23, and since the brake shell is held at each end against rotation by the shoulder 15 and the lug 17½, respectively, the bar will expand it.

Various means may be employed to connect the brake-actuator 12 with the sprocket 4. In the drawings, I show (see Fig. 5) the same connector that is shown in my said previous application. This is a nut that carries at one end the screw threaded sleeve 25, that receives the sprocket, and at the other the retarder sleeve that enters the carrier sleeve 12 and carries the retarding ring 27.

What I claim is:—

1. The combination with a revoluble hub, of a driver; a nonrotary, brake-ring within the hub split parallel with its axis; an expander adapted to engage one of the longitudinal edges of said brake-ring; and means operated by said driver for moving said expander circumferentially to expand said brake-ring; substantially as shown and described.

2. The combination with a revoluble hub, of a driver; a brake ring within the hub split parallel with its axis; a non-rotary part adjacent to the brake ring; means for connecting said brake ring to said non-rotary part, adjacent one longitudinal edge; an expander adapted to engage the free longitudinal edge of said brake-ring; and means operated by said driver for moving said expander circumferentially to expand said brake ring; substantially as shown and described.

3. The combination with a revoluble hub, of a driver; a non-rotary, longitudinally split brake ring within the hub; an expander adapted to engage one of the longitudinal edges of said brake-ring; and an actuator held against rotation by connection with a non-rotary part, and moved longitudinally by the driver, to engage and move in turn said expander circumferentially to expand said brake ring; substantially as shown and described.

4. The combination with a revoluble hub, of a driver; a non-rotary, longitudinally split brake ring within the hub; an expander adapted to engage one of the longitudinal edges of said brake-ring; and a non-rotary wedge actuator operated by the driver and adapted to move longitudinally to engage and shift the expander circumferentially and thereby to expand the brake ring; substantially as shown and described.

5. The combination with a revoluble hub, of a driver; a non-rotary, longitudinally split brake ring within the hub; an expanding bar between the edges of said brake ring; non-rotary wedge means of the same angle adapted to engage said bar at separated points; and means, operated by the driver, for moving said bar and wedge means longitudinally with reference to each other to expand the brake ring; substantially as shown and described.

6. The combination with a revoluble hub, of a driver; a non-rotary part at one end of the hub; a brake carrier attached to said non-rotary part but movable longitudinally with reference to it and carrying an inwardly directed wedge; an expansible brake ring non-rotatably supported in said carrier; an expanding bar adapted to engage said brake ring to expand it and to be moved circumferentially by longitudinal movement of said wedge; and a connection between said driver and said carrier whereby said wedge is moved longitudinally; substantially as shown and described.

FREDERICK S. ELLETT.

Witnesses:
 D. L. WHITTIER,
 RALPH D. WEBSTER.